No. 788,530. PATENTED MAY 2, 1905.
M. HERMSDORF.
BARREL RECOIL GUN WITH WEDGE BREECH BLOCK.
APPLICATION FILED MAY 2, 1904.

7 SHEETS—SHEET 1.

Witnesses:
Jno. R. Adams
O. Knight Jr.

Inventor:
Max Hermsdorf
By Knight Bro.
Attys.

No. 788,530. PATENTED MAY 2, 1905.
M. HERMSDORF.
BARREL RECOIL GUN WITH WEDGE BREECH BLOCK.
APPLICATION FILED MAY 2, 1904.

7 SHEETS—SHEET 3.

Witnesses:
Jno. R. Adams
O. Knight Jr.

Inventor:
Max Hermsdorf
By Knight Bros
Attys

No. 788,530. PATENTED MAY 2, 1905.
M. HERMSDORF.
BARREL RECOIL GUN WITH WEDGE BREECH BLOCK.
APPLICATION FILED MAY 2, 1904.

7 SHEETS—SHEET 4.

Witnesses:
Jno R Adams
O. Knight Jr.

Inventor:
Max Hermsdorf
By Knight Bros
Attys.

No. 788,530. PATENTED MAY 2, 1905.
M. HERMSDORF.
BARREL RECOIL GUN WITH WEDGE BREECH BLOCK.
APPLICATION FILED MAY 2, 1904.

7 SHEETS—SHEET 5.

Witnesses:
Jno R Adams
O. Knight Jr.

Inventor,
Max Hermsdorf,
By Knight Bros,
Attys.

No. 788,530. PATENTED MAY 2, 1905.
M. HERMSDORF.
BARREL RECOIL GUN WITH WEDGE BREECH BLOCK.
APPLICATION FILED MAY 2, 1904.

7 SHEETS—SHEET 7.

Witnesses:
Inventor,
Max Hermsdorf
By Knight Bros.
Attys.

No. 788,530.

Patented May 2, 1905.

UNITED STATES PATENT OFFICE.

MAX HERMSDORF, OF ESSEN-ON-THE-RUHR, GERMANY, ASSIGNOR TO FRIED. KRUPP, AKTIENGESELLSCHAFT, OF ESSEN-ON-THE-RUHR, GERMANY.

BARREL-RECOIL GUN WITH WEDGE BREECH-BLOCK.

SPECIFICATION forming part of Letters Patent No. 788,530, dated May 2, 1905.

Application filed May 2, 1904. Serial No. 206,033.

*To all whom it may concern:*

Be it known that I, MAX HERMSDORF, a subject of the Emperor of Germany, and a resident of Essen-on-the-Ruhr, Germany, have invented certain new and useful Improvements in Barrel-Recoil Guns with Wedge Breech-Blocks, of which the following is a specification.

The present invention relates to barrel-recoil guns with wedge breech-blocks; and it has for its object to provide an arrangement for automatically opening and closing the breech-block, which arrangement is of a simple and compact construction and makes it possible to use a portion of the recoil energy for the closing of the breech-block, thus relieving the recuperator. I attain the said object by arranging a drum loosely on the shaft for opening and closing the breech-block, upon which drum acts on the one hand a spring connected to the shaft and on the other a draw-bar connected with a part of the gun that remains stationary during recoil, while between the drum and the shaft an interlocking arrangement is so arranged that it enters into locking position when tension has been imparted to the spring and keeps the spring under tension during running out of the gun.

Figure 1:
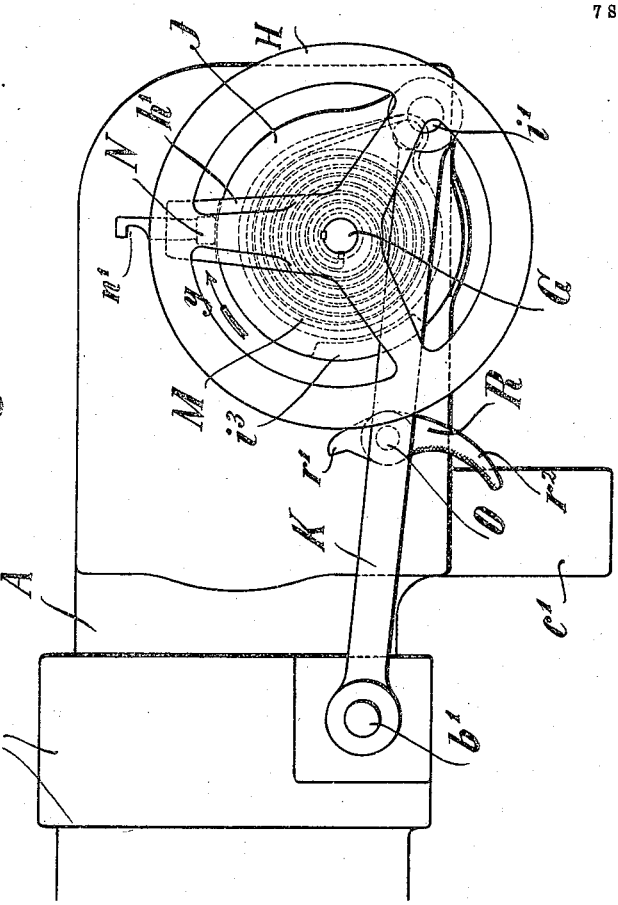
Figure 2:
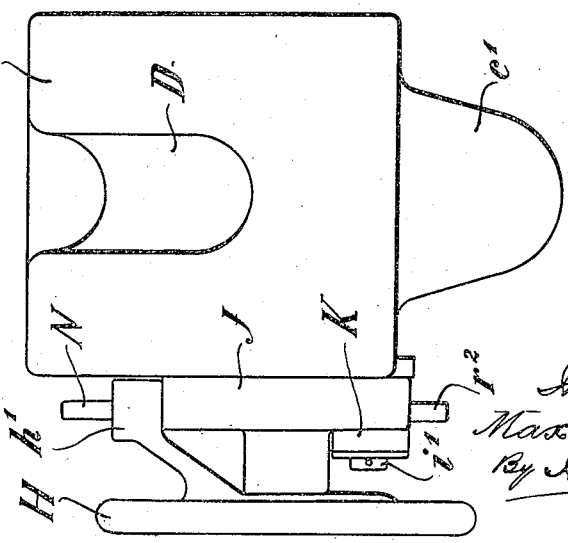
Figure 3:
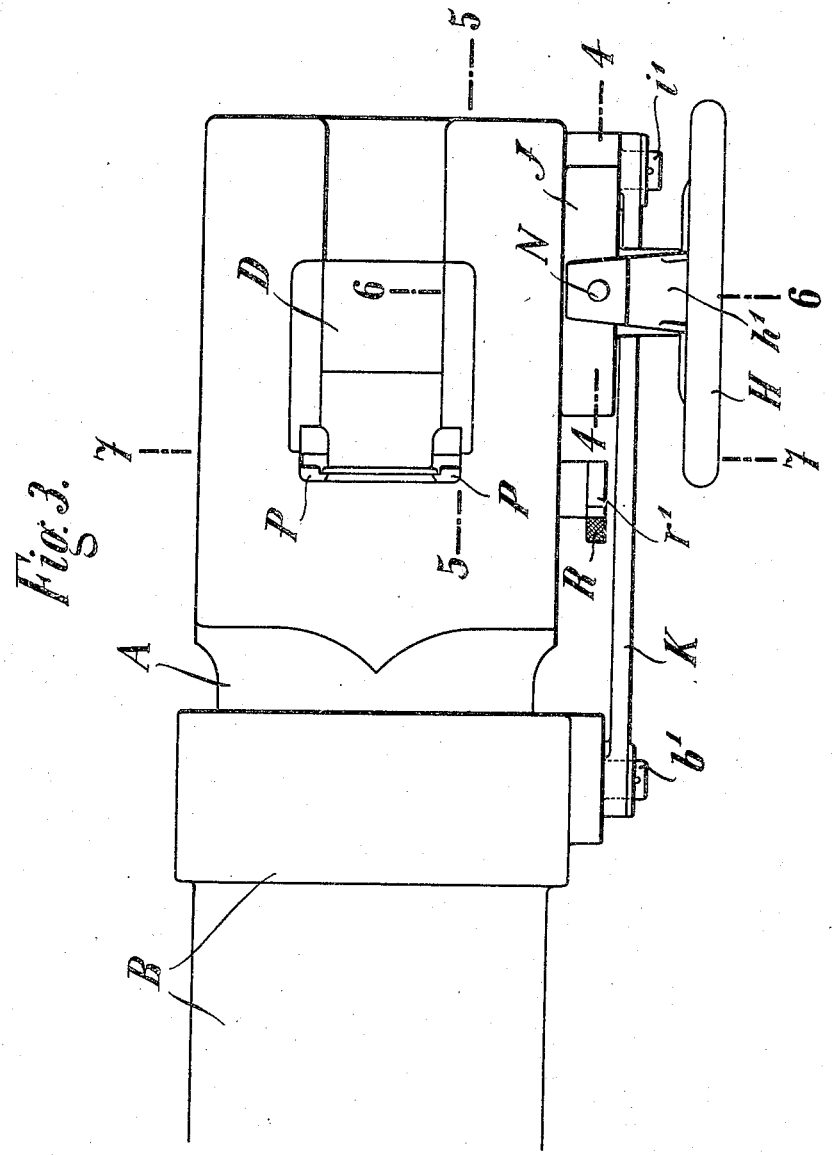
Figure 4:
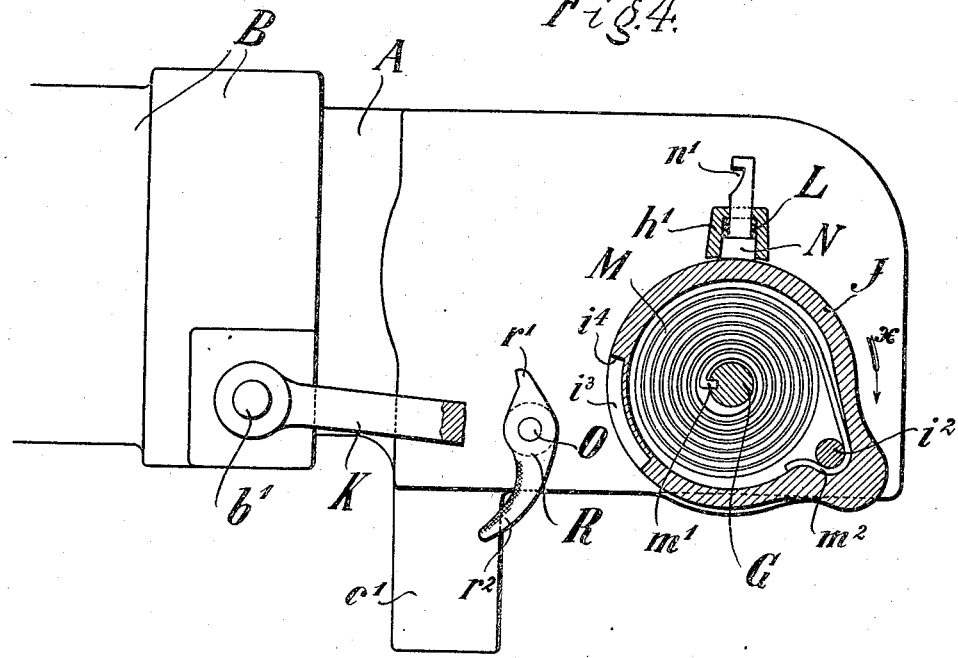
Figure 5:
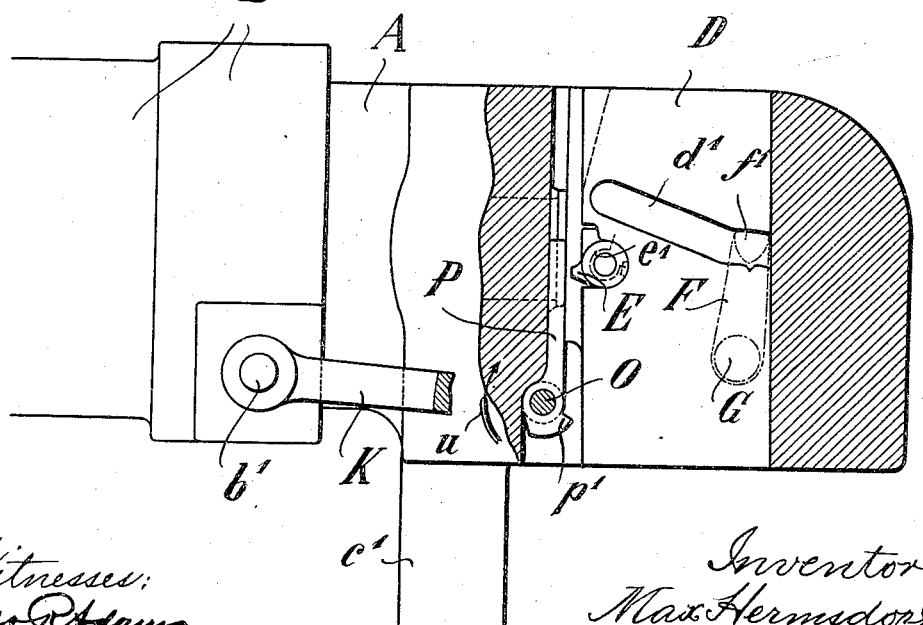
Figure 6:
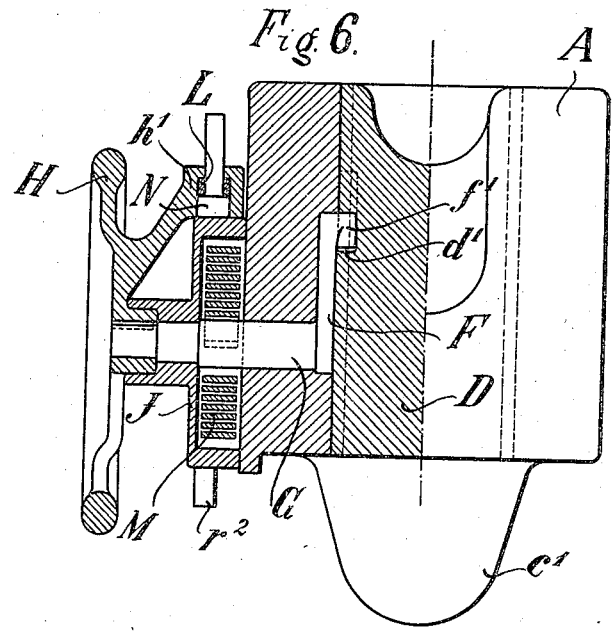
Figure 7:
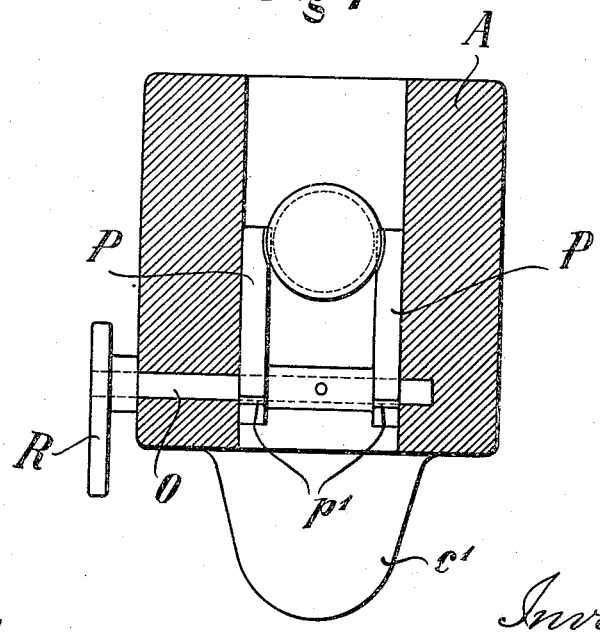
Figure 8:
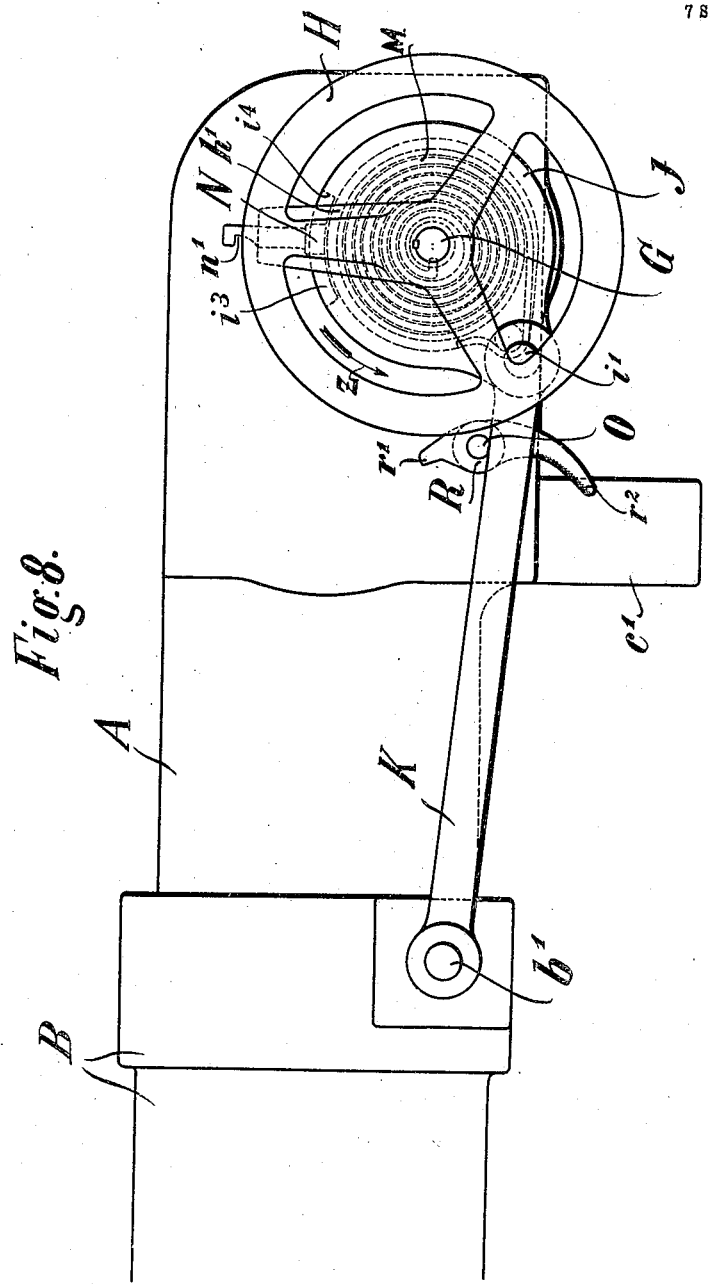
Figure 9:
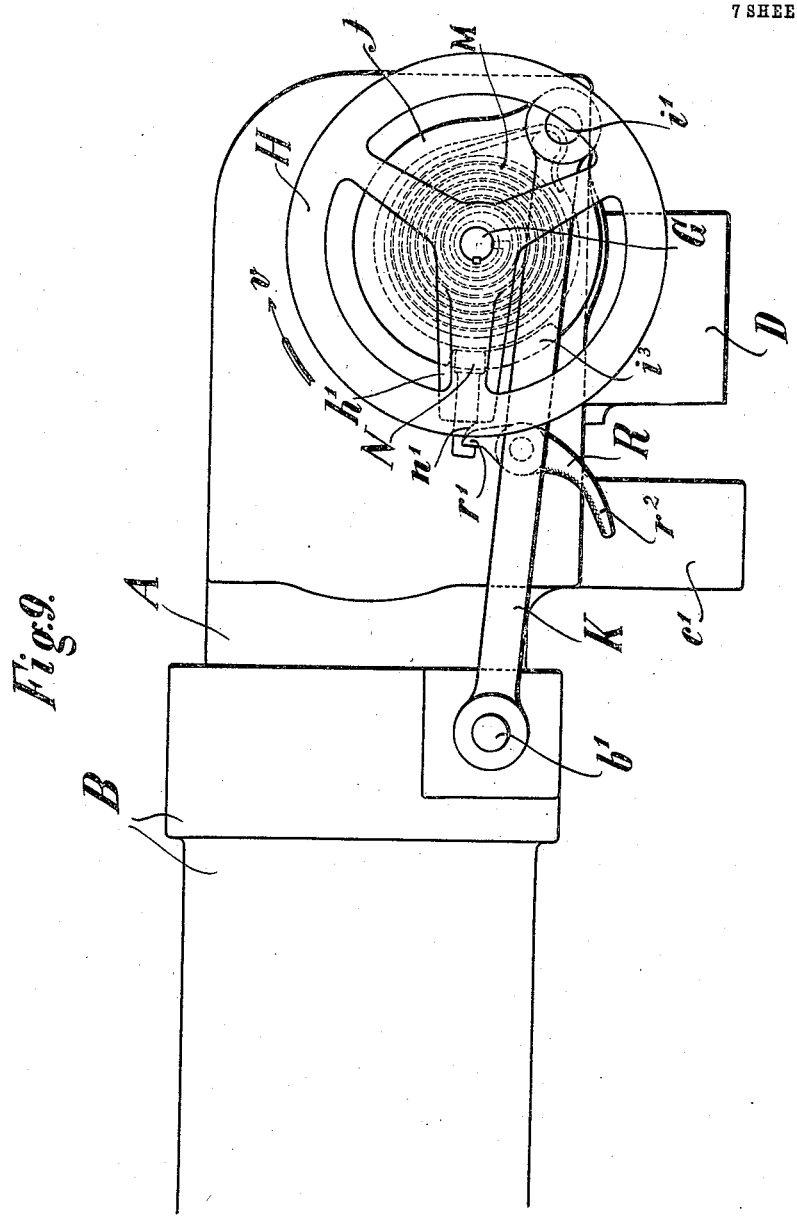
Figure 10:
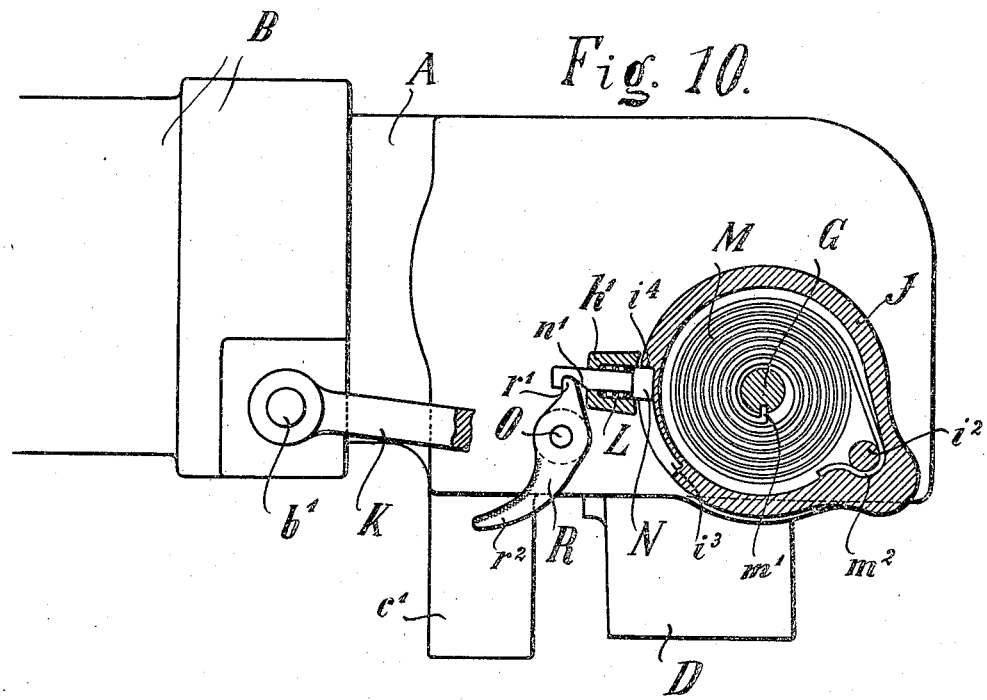
Figure 11:
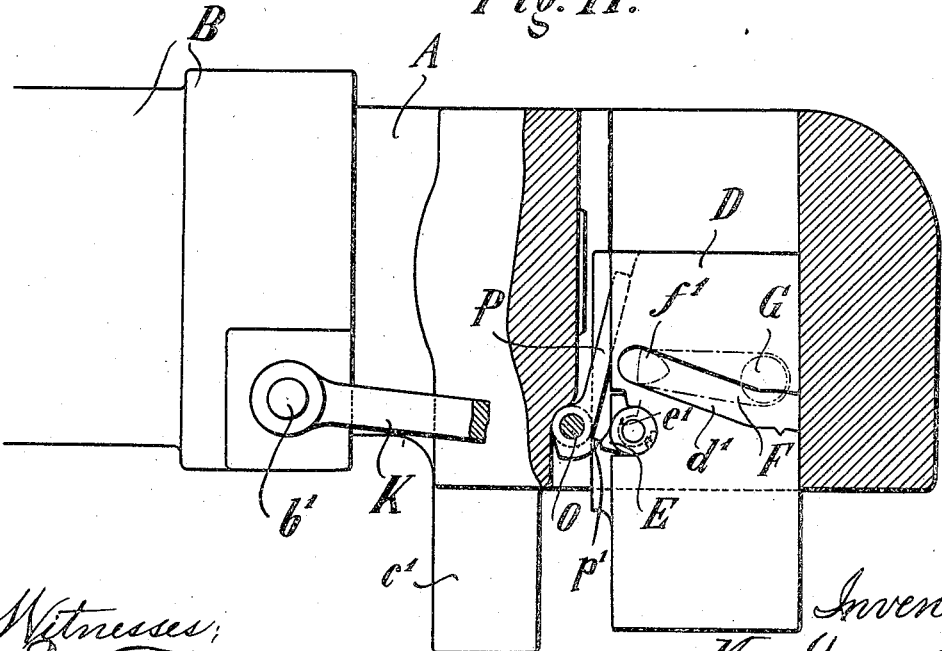

In the annexed drawings, which show an example of my invention as used in guns having a vertical-wedge breech-block and swinging ejector, Figure 1 is a side view of the part of the gun on which my invention is used. The parts are shown in the position in which the gun is ready for discharging and the breech-block is closed. Fig. 2 is a rear view, and Fig. 3 a top view, of Fig. 1. Fig. 4 is a side view corresponding to Fig. 1, partly in section on line 4 4, Fig. 3. Fig. 5 is a side view corresponding to Fig. 1, partly in section on line 5 5, Fig. 3. Fig. 6 is a rear view corresponding to Fig. 2, partly in section on line 6 6, Fig. 3. Fig. 7 is a cross-section on line 7 7, Fig. 3, seen from the right. Fig. 8 is a side view corresponding to Fig. 1, showing the positions of the several parts when the barrel has completed its recoil. Fig. 9 is a side view corresponding to Fig. 1, showing the positions of the several parts when the breech-block has been opened. Fig. 10 is a sectional view with the parts in positions corresponding to Fig. 9, but partly in section corresponding to Fig. 4. Fig. 11 is a sectional view similar to Fig. 5, but showing the positions of the parts corresponding to Fig. 9.

The gun-barrel A is slidingly embedded in the cradle B and is by means of the horn $c'$ connected with the recuperator. (Not shown.) The breech-block D is provided with a groove $d'$, (see Figs. 5 and 11,) engaged by the stud $f'$ of the lifting-crank F, Figs. 5 and 6, through the medium of which the opening and closing of the breech-block is effected. The ejector P, Figs. 3, 5, 7, and 11, is rigidly secured on the shaft O, which is journaled in the breech and provided with bosses $p'$, Figs. 5 and 7, which are designed to coöperate with the cams E, Fig. 5, journaled in the breech-block. Each of the cams E is acted upon by a spring $e'$, which tends to keep them in the position shown in Figs. 5 and 11. These cams are so arranged on the breech-block that during the opening of the breech-block the ejector is swung out completely, Fig. 11, before the breech-block D has reached its lowest position.

The arrangements above described are of a kind commonly known, so that further explanation thereof would be superfluous.

A drive-wheel H is rigidly secured on the end of the shaft G of lifting-crank F, which projects outside of the barrel-breech. On the shaft G between the drive-wheel H and the breech is loosely mounted a rotatable drum. (See especially Fig. 6.)

On the side toward the drive-wheel H drum J is provided with a crank-pin $i''$, which by means of the draw-bar K is linked to a pin $b'$ on the cradle B.

In the interior of the drum J a spiral spring M is arranged, Figs. 4 and 6, the inner end $m'$ of which projects into a slot in the shaft G and the outer end $m^2$ of which is bent around a pin $i^2$, located on the interior of the drum. The spring M is under initial tension in such a manner that when the drum is kept from rotation the spring tends to rotate the shaft G in the direction of the arrow *x*, Fig. 4.

Between the shaft G and the drum J an interlocking arrangement is inserted. One part of the interlocking arrangement is formed by a bolt N, Figs. 4, 6, and 10, actuated by a spring L, which bolt is arranged to move radially to the axis of shaft G, but not to rotate in the free end of a lateral arm *h'*, projecting over the drum J from the drive-wheel H. The part of the bolt N projecting outside of the arm *h'* is provided with a notch *n'* for a purpose hereinafter mentioned. The other part of the interlocking arrangement consists of a shoulder $i^4$, which forms one of the walls of the short groove $i^3$, cut in the drum J. The spring L is arranged in such a manner that it presses the bolt N against the cylindrical circumference of the drum J or against the bottom of the groove $i^3$.

On the end of the ejector-shaft O, projecting outside of the breech, a two-armed lever R is rigidly secured. The one arm, $r^2$, of the lever R is trigger-shaped, while the other arm is provided with a sear *r'*. The relative arrangement of the lever R and the bolt N is such that when the parts are in the position shown in Fig. 9 the sear *r'* of the lever R is in engagement with the notch *n'* of the bolt N.

The operation of the invention is as follows: Just before the gun is discharged the parts are in the positions shown in Figs. 1 to 7. The gun-barrel A is with relation to the cradle B in its foremost and the breech-block D in its uppermost position. The spring M is under initial tension, and the bolt N rests on the cylindrical circumference of the drum J. The ejector P rests against the front wall of the breech-block opening and engages the rim of the cartridge-case. When the gun is discharged, the gun-barrel runs backward in the cradle B, and by means of the draw-bar K the drum J is rotated in the direction of the arrow *y*, Fig. 1. The end $m^2$ of the spring M partakes of the movement of the drum, while the other end *m'* cannot follow the rotation of the drum, as the stud *f'* of the crank F rests against the rear wall of the breech-block opening, Fig. 5. Additional tension is consequently imparted to the spring M. During the rotation of the drum the bolt N first slides on the circumference of the drum and thereupon drops into the groove $i^3$, in which it slides during the further rotation of the drum. At the end of normal length of recoil the parts assume the position shown in Fig. 8. The breech-block is closed and the spring M is under high tension. The groove $i^3$ has the position and the length shown, for the reason that variations in the length of recoil are likely to take place, according to the angle of elevation of the gun-barrel, and the bolt N must in any case be able to drop into the groove and, on the other hand, not proceed so far therein that it hits the shoulder at the end thereof. Upon the forward movement of the gun-barrel the drum J is by means of the draw-bar K turned in the direction of the arrow *z*, Fig. 8. The drum first turns loosely on the shaft G until the shoulder $i^4$ engages the bolt N, after which the drum carries the drive-wheel H along with it. By means of the shaft G and the lifting-crank F the drive-wheel H moves the breech-block D downward, and through the medium of the cams E the latter effects a sudden swinging movement of the ejector P, with its shaft O and the lever R, in the direction of the arrow *u*, Fig. 5, and the empty cartridge-case is ejected. The ejector P and the lever R are thus in the positions shown in Figs. 9, 10, and 11 before the downward movement of the breech-block and the rotation of the drive-wheel have come to an end, so that when the drive-wheel has reached the position shown in Fig. 9 the notch *n'* of the bolt N can engage the sear *r'* of the lever R. All the parts have then assumed the positions shown in Figs. 9 to 11.

The spring M, to which tension has been imparted by the recoil, is only so far affected by the steps just described that it loses a small amount of its tension from the moment when the forward movement commences, Fig. 8, and until the shoulder $i^4$ comes into engagement with the bolt N.

When the gun is charged, the ejector P is turned back to its normal position by the rim of the cartridge-case, the lever R partakes in the turning of the ejector-shaft, and the cam *r'* draws the bolt N out from the groove $i^3$ of the drum J. The bolt N is consequently brought out of engagement with the shoulder $i^4$, and the drive-wheel H and the shaft G are thus free to be rotated in the direction of the arrow *v*, Fig. 9, by the tension of the spring. The rotation of the shaft G effects, by means of the lifting-crank F, the closing of the breech-block. When the breech-block moves upward, the cams E yield to the bosses *p'* of the ejector P, and when they have passed said bosses they are returned to their normal position by their springs *e'*.

When the breech-block is closed, the parts are again in the position shown in Figs. 1 to 7.

If it is desired to close the breech-block without charging the gun, this can easily be done by throwing the lever R by its trigger $r^2$, thus bringing the bolt M out of engagement with the shoulder $i^4$.

I do not limit myself to the special form of construction above described, as the same may be modified in numerous particulars without departing from the scope of the invention.

Having thus described the invention, the following is what is claimed as new therein:

1. In a recoil-gun, the combination with a fixed part of the gun and the barrel recoiling relatively thereto, of a breech-block, a spring recoiling bodily with the barrel, connection between one end of the spring and the breech-block, connection between the other end of the spring and the fixed part for storing power in the spring on recoil, means for locking the spring during the return to the connection with the fixed part to cause said connection to open the breech-block, and means for releasing the spring to close the breech-block.

2. In a recoil-gun, the combination of a fixed part, the recoiling barrel, the breech-block, a rotatable shaft having connections through which it opens and closes the breech-block, a drum rotatable on said shaft, a spring secured at its respective ends to said shaft and drum, a connection between the fixed part and said drum, rotating the drum during the recoil, in a direction to cause tension to be imparted to the spring and in the opposite direction during return movement of the gun-barrel, means coupling said shaft and said drum together during said return movement of the barrel, keeping the spring under tension and rotating the shaft in the direction for opening the breech-block, and means for uncoupling said shaft and said drum to allow the spring to rotate the shaft and close the breech-block.

3. In a recoil-gun, the combination of a fixed part, the recoiling barrel, the breech-block shaft journaled in the breech and having opening and closing connection with the breech-block, a drum rotatable on said shaft and having a groove in its outer periphery, a convolute spring having its ends secured to said shaft and drum, a draw-bar connecting said fixed support and said drum, causing the drum to rotate during recoil and running-out movements of the barrel and imparting tension to the spring in the direction of closing the breech-block during such recoil, a transverse arm projecting from the shaft, carrying a spring-actuated bolt adapted to enter the recess in the outer periphery of the drum, and couple the shaft and drum together during the return movement of the gun-barrel, thereby keeping said spring under tension and opening the breech-block, and means for disengaging said spring-actuated bolt from said drum to allow the convolute spring to rotate the shaft independently of the drum and close the breech-block.

4. In a recoil-gun, the combination of a fixed part, the recoiling barrel, the breech-block, the rotatable shaft, the rotatable drum, the spring having its ends secured to said shaft and said drum, the connection through which the fixed support and drum are connected to rotate the drum during the recoil, and return movements of the barrel, the spring-pressed bolt for interlocking the shaft and drum during return movement of the gun, for the purposes explained, a shaft carrying a sear engaging the spring-pressed interlocking bolt for disengaging it, and an ejector mounted on said shaft whereby charging the gun causes the breech to be closed.

5. In a recoil-gun, the combination of a fixed part, the recoiling barrel, the breech-block, the rotatable shaft, the rotatable drum, the spring having its ends secured to said shaft and said drum, the connection through which the fixed support and drum are connected to rotate the drum during the recoil, and return movements of the barrel, the spring-pressed bolt for interlocking the shaft and drum during return movement of the gun, for the purposes explained, a shaft carrying a sear engaging the spring-pressed interlocking bolt for disengaging it, an ejector mounted on said shaft, and means on the breech-block for imparting a swinging movement to said ejector-shaft during the opening of the breech-block.

The foregoing specification signed at Düsseldorf, Germany, this 2d day of April, 1904.

MAX HERMSDORF.

In presence of—
WILLIAM ESSENWEIN,
PETER LIEBER.